United States Patent
Kumar et al.

(10) Patent No.: US 11,176,649 B1
(45) Date of Patent: Nov. 16, 2021

(54) SYSTEM AND METHOD OF IDENTIFYING PRESENCE OF DIGITAL GHOSTING ARTIFACTS IN VIDEOS

(71) Applicant: Interra Systems, Inc., Cupertino, CA (US)

(72) Inventors: Alok Kumar, Kapurthala (IN); Bhupender Kumar, Palwal (IN); Paras Garg, Delhi (IN)

(*) Notice: Subject to any disclaimer, the term of this patent is extended or adjusted under 35 U.S.C. 154(b) by 0 days.

(21) Appl. No.: 15/613,155

(22) Filed: Jun. 3, 2017

(51) Int. Cl.
  *G06K 9/00* (2006.01)
  *G06T 7/00* (2017.01)
  *G06K 9/62* (2006.01)

(52) U.S. Cl.
  CPC .......... *G06T 7/0002* (2013.01); *G06K 9/6212* (2013.01); *G06K 9/6215* (2013.01); *G06T 2207/10016* (2013.01); *G06T 2207/20221* (2013.01); *G06T 2207/30168* (2013.01)

(58) Field of Classification Search
  CPC ......... G06T 7/0002; G06T 2207/10016; G06T 2207/20221; G06T 2207/30168; G06K 9/6212; G06K 9/6215
  See application file for complete search history.

(56) References Cited

U.S. PATENT DOCUMENTS

| | | | |
|---|---|---|---|
| 6,100,689 A | 8/2000 | Huff et al. | |
| 7,558,320 B2 * | 7/2009 | Winder | H04N 5/145 348/699 |
| 8,564,724 B2 | 10/2013 | Hong et al. | |
| 8,953,882 B2 * | 2/2015 | Lim | H04N 17/002 348/241 |
| 9,258,490 B2 | 2/2016 | Vidal-Naquet et al. | |
| 9,332,239 B2 * | 5/2016 | Cote | H04N 9/646 |
| 2004/0252759 A1 * | 12/2004 | John Winder | H04N 5/145 375/240.12 |

(Continued)

FOREIGN PATENT DOCUMENTS

EP  2515273 A1  10/2012

OTHER PUBLICATIONS

Guthe et al., "Ghosting and Popping Detection for Image-Based Rendering", Jul. 5, 2016, 4 Pages.

*Primary Examiner* — Jonathan S Lee
(74) *Attorney, Agent, or Firm* — Benjamin Balser; Next IP Law Group

(57) ABSTRACT

A system and method for identifying presence of digital ghosting artifacts in videos is disclosed. The method comprises estimating a blending parameter ($\alpha$) for a current image using a previous image and a next image of a digital video stream. Successively, a blended image (B) is created by mixing contents of the previous image and the next image based on the estimated blending parameter ($\alpha$). Thereafter, a first similarity is computed between the blended image (B) and a de-interlaced image (C), based on a Normalized Cross Correlation (NCC) between multiple blocks of the blended image (B) and the de-interlaced image (C). Successively, a second similarity is computed between the blended image (B) and the de-interlaced image (C), based on values of standard deviation of an absolute difference frame determined between the blended image (B) and the de-interlaced image (C). The de-interlaced image (C) is finally identified to comprise digital ghosting artifact based on values of the first similarity and the second similarity.

20 Claims, 5 Drawing Sheets

(56) References Cited

U.S. PATENT DOCUMENTS

2010/0246691 A1   9/2010  Filippini et al.
2013/0114906 A1*  5/2013  Diggins ................ G06T 7/0002
                                                        382/218

* cited by examiner

SYSTEM AND METHOD OF IDENTIFYING PRESENCE OF DIGITAL GHOSTING ARTIFACTS IN VIDEOS

FIELD OF THE DISCLOSURE

The presently disclosed embodiments are generally related to ghosting artifacts and more particularly to detection of digital ghosting artifacts in digital video streams.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Ghosting may be of both analog and digital in nature. Analog ghosting may be present due to refraction of an electromagnetic wave in one part of a scanning plane. Digital ghosting may be present when moving objects across multiple images are combined into one image. The resulting image may comprise an overlap of objects present in multiple images and thus may not be clear.

Thus, digital ghosting may occur in cases where a video frame is formed by applying de-interlacing operation on a frame composed of two image fields having inter-field motion or the two image fields belong to different shots. Such situation is prevalent at shot boundaries comprising frames with adjoining fields having different contents. Digital ghosting artifact is different from field dominance, particularly at shot boundaries, because it is not possible to separate contents of two interleaved fields after de-interlacing. The digital ghosting artifact is also very common in current media workflows where de-interlacing is applied to remove highly perceived interlacing artifact, particularly at the shot boundaries.

Thus, a system and a method for identifying presence of digital ghosting artifacts in videos are much desired, for improving quality of a video.

BRIEF SUMMARY

It will be understood that this disclosure in not limited to the particular systems, and methodologies described, as there can be multiple possible embodiments of the present disclosure which are not expressly illustrated in the present disclosure. It is also to be understood that the terminology used in the description is for the purpose of describing the particular versions or embodiments only, and is not intended to limit the scope of the present disclosure.

In an example embodiment, a method of identifying presence of digital ghosting artifacts in videos is described. The method comprises estimating a blending parameter (a) for a current image, using a previous image and a next image of a digital video stream. The method further comprises creating a blended image (B) by mixing contents of the previous image and the next image based on the estimated blending parameter (a). The method further comprises computing a first similarity between the blended image (B) and a de-interlaced image (C). The first similarity may be computed using Normalized Cross Correlation (NCC) between multiple blocks of the blended image (B) and the de-interlaced image (C). The method further comprises computing a second similarity between the blended image (B) and the de-interlaced image (C). The second similarity may be computed based on values of standard deviation computed for multiple blocks in an absolute difference frame determined between the blended image (B) and the de-interlaced image (C). The method further comprises validating the de-interlaced image (C) to comprise digital ghosting artifact. The validation of presence of the digital ghosting artifact may depend on values of the first similarity and the second similarity.

In an example embodiment, a system for identifying presence of digital ghosting artifacts in videos is described. The system comprises a processor to estimate a blending parameter ($\alpha$) for a current image, using a previous image and a next image of a digital video stream. The processor may further create a blended image (B) by mixing contents of the previous image and the next image based on the estimated blending parameter ($\alpha$). The processor may further compute a first similarity between the blended image (B) and a de-interlaced image (C). The first similarity may be computed based on a Normalized Cross Correlation (NCC) between multiple blocks of the blended image (B) and the de-interlaced image (C). The processor may further compute a second similarity between the blended image (B) and the de-interlaced image (C). The second similarity may be computed based on values of standard deviation computed for multiple blocks in an absolute difference frame determined between the blended image (B) and the de-interlaced image (C). The processor may further validate the de-interlaced image (C) to comprise digital ghosting artifact. The validation of presence of the digital ghosting artifact may depend on values of the first similarity and the second similarity.

In an example embodiment, a non-transitory computer readable medium embodying a program executable in a computing device for identifying presence of digital ghosting artifacts in videos is described. The program may comprise a program code for estimating a blending parameter ($\alpha$) for a current image, using a previous image and a next image of a digital video stream. The program may further comprise a program code for creating a blended image (B) by mixing contents of the previous image and the next image based on the estimated blending parameter ($\alpha$). The program may further comprise a program code for computing a first similarity between the blended image (B) and a de-interlaced image (C). The first similarity may be computed based on a Normalized Cross Correlation (NCC) between multiple blocks of the blended image (B) and the de-interlaced image (C). The program may further comprise a program code for computing a second similarity between the blended image (B) and the de-interlaced image (C). The second similarity may be computed based on values of standard deviation computed for multiple blocks in an absolute difference frame determined between the blended image (B) and the de-interlaced image (C). The program may further comprise a program code for validating the de-interlaced image (C) to comprise digital ghosting artifact. The validation of presence of the digital ghosting artifact may depend on values of the first similarity and the second similarity.

BRIEF DESCRIPTION OF THE DRAWINGS

The accompanying drawings illustrate various embodiments of systems, devices, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIG. 2a illustrates a previous image, FIG. 2b illustrates a next image, and FIG. 2c illustrates a current image comprising ghosting artifact.

DETAILED DESCRIPTION

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the preferred, systems and methods are now described.

Unless specifically stated otherwise, as apparent from the following discussion, it is appreciated that throughout this specification discussions utilizing terms such as "processing," "performing," "partitioning," "determining," or the like refer to the actions or processes that may be performed by a computing platform, such as a computer or a similar electronic computing device, that is operable to manipulate or transform data represented as physical, electronic or magnetic quantities or other physical quantities within the computing platform's processors, memories, registers, or other information storage, transmission, reception or display devices. Accordingly, a computing platform refers to a system or a device that includes the ability to process or store data in the form of signals. Thus, a computing platform, in this context, may comprise hardware, software, firmware or any combination thereof. Further, unless specifically stated otherwise, a process as described herein, with reference to flowcharts or otherwise, may also be executed or controlled, in whole or in part, by a computing platform.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Figure 1:
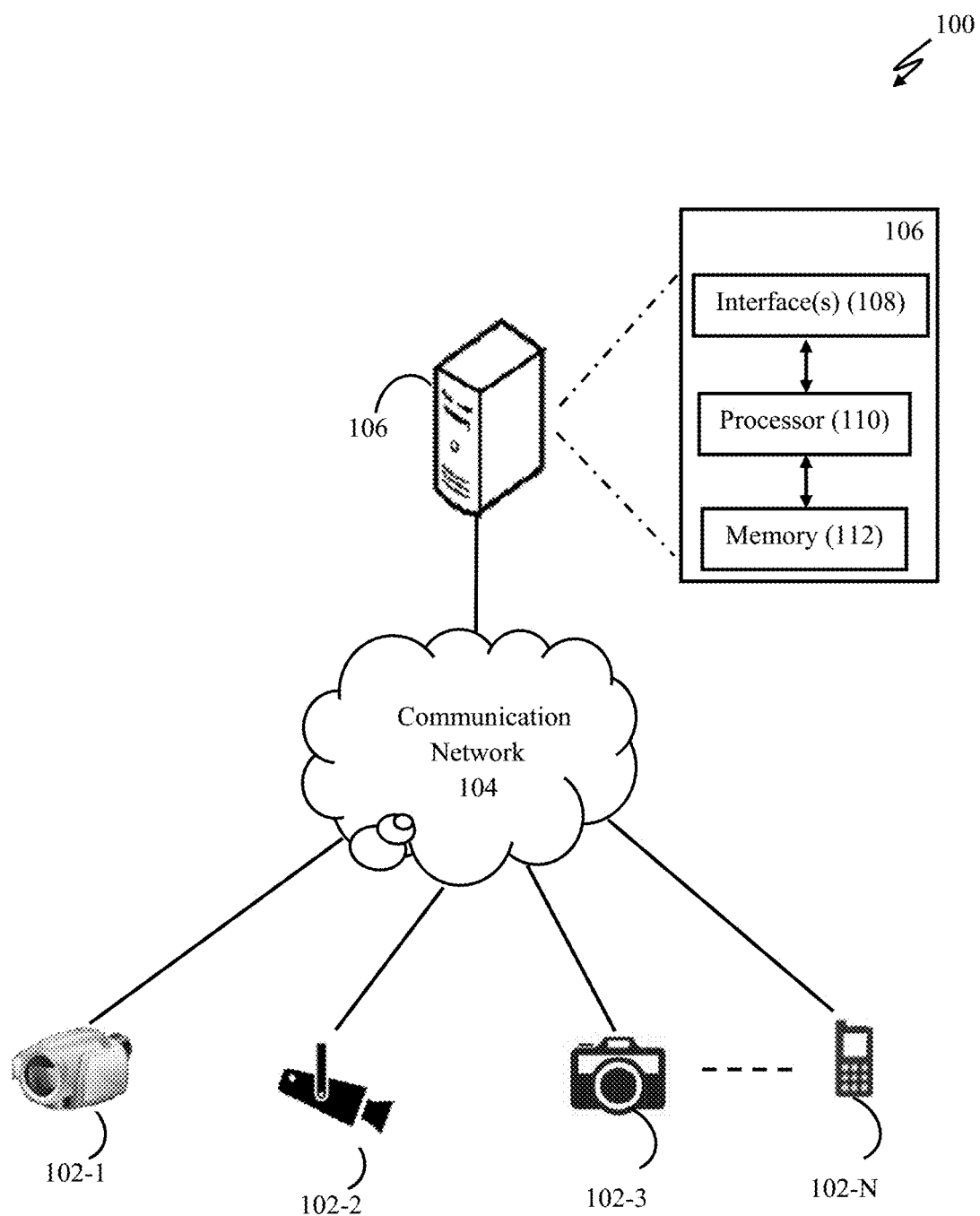
FIG. 1 illustrates a network connection diagram 100 of a system for identifying presence of digital ghosting artifacts in videos, in accordance with an embodiment of present disclosure.

It is an object of the current disclosure to provide a system and a method for identifying presence of digital ghosting artifacts in videos. FIG. 1 illustrates a network connection diagram 100 of a system 106 for identifying presence of digital ghosting artifacts in videos, in accordance with an embodiment of present disclosure. The network connection diagram 100 illustrates video capturing devices 102-1 to 102-N connected to a communication network 104. The system 106 is also connected to the communication network 104.

The video capturing devices 102-1 to 102-N may be any digital video capturing device such as a handy cam 102-1, a Closed Circuit Television (CCTV) camera 102-2, a pocket digital camera 102-3, camera of a smart phone 102-N, or any other video capturing means which can provide a digital image and/or digital video.

The communication network 104 may be implemented using at least one communication technique selected from Visible Light Communication (VLC), Worldwide Interoperability for Microwave Access (WiMAX), Long term evolution (LTE), Wireless local area network (WLAN), Infrared (IR) communication, Public Switched Telephone Network (PSTN), Radio waves, and any other wired and/or wireless communication technique known in the art.

The system 106 may comprise interface(s) 108, processor 110, and memory 112. The processor 110 may execute computer program instructions stored in a memory 112. The processor 110 may also be configured to decode and execute any instructions received from one or more other electronic devices or one or more remote servers. The processor 110 may include one or more general purpose processors (e.g., INTEL microprocessors) and/or one or more special purpose processors (e.g., digital signal processors or Xilinx System On Chip (SOC) Field Programmable Gate Array (FPGA) processor). The processor 110 may be configured to execute one or more computer-readable program instructions, such as program instructions to carry out any of the functions described in this description.

The memory 112 may include a computer readable medium. A computer readable medium may include volatile and/or non-volatile storage components, such as optical, magnetic, organic or other memory or disc storage, which may be integrated in whole or in part with a processor, such as processor 110. Alternatively, the entire computer readable medium may be remote from processor 110 and coupled to processor 110 by connection mechanism and/or network cable. In addition to memory 112, there may be additional memories that may be coupled with the processor 110.

Interface(s) 108 may be used to interact with or program the system 106 to detect presence of digital ghosting artifacts. The interface(s) 108 may either be a Command Line Interface (CLI) or a Graphical User Interface (GUI).

In one embodiment, at least one device of the video capturing devices 102-1 to 102-N may be used to capture a digital video stream. The digital video stream may be composed of a series of digital images. The digital video stream may be transmitted to the system 106, through the communication network 104, for further processing to detect presence of digital ghosting artifacts in the digital video stream.

Figure 2A:
FIGS. 2a, 2b, and 2c collectively illustrates three consecutive images of a video frame where
Figure 2B:
Figure 2C:

In one embodiment, to detect presence of digital ghosting artifacts, the system 106 may estimate a blending parameter ($\alpha$) for the series of digital images present in the digital video stream. In one case, the series of images may comprise a current image, previous image, and a next image, as illustrated collectively using FIGS. 2a, 2b, and 2c. FIG. 2a illustrates a previous image, FIG. 2b illustrates a next image, and FIG. 2c illustrates a current image comprising ghosting artifact. To detect the ghosting artifact, at first, linear blending relation between the current image, previous image, and the next image may be defined using a below mentioned Equation 1.

$$f(x)=(1-\alpha)f(x-1)+\alpha f(x+1) \qquad \text{Equation 1}$$

In the above mentioned equation 1, $f(x-1)$ denotes the previous image, $f(x+1)$ denotes the next image, and $f(x)$ denotes the current image. The Equation 1 may be modified to obtain the blending parameter ($\alpha$) in a range of 0-100 using a below mentioned Equation 2.

$$\alpha=(f(x)-f(x-1))*100/(f(x+1)-f(x-1)) \qquad \text{Equation 2}$$

Figure 3:
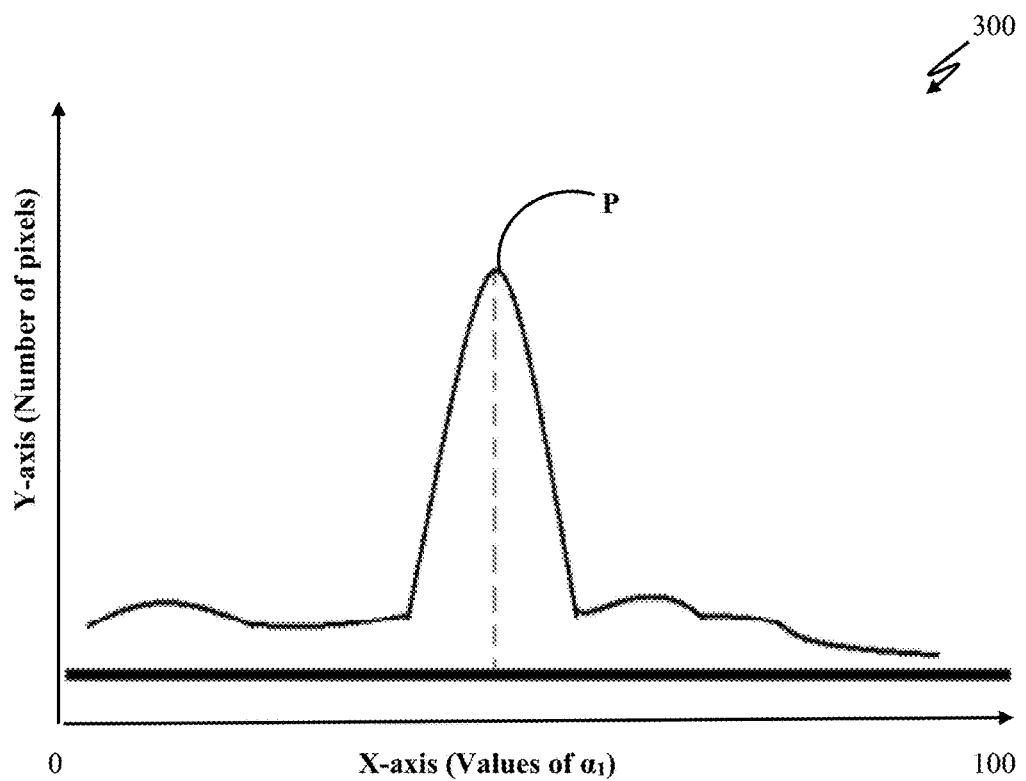
FIG. 3 depicts a plot of histogram array 300 of the candidate blending parameters ($\alpha_1$).

As evident from the above Equation 2, to determine candidate blending parameters ($\alpha_1$), the system 106 may use co-located pixel values of the previous image ($f(x-1)$), the current image ($f(x)$), and the next image ($f(x+1)$). Successively, the system 106 may prepare a histogram array 300 of the candidate blending parameters ($\alpha_1$), as depicted in FIG. 3. In one case, the arrays of the candidate blending parameters ($\alpha_1$) may comprise values ranging from 0 to 100, as illustrated on x-axis of the histogram array 300. Y-axis of the histogram array 300 illustrates a number of pixels having a particular candidate blending parameter ($\alpha_1$). The candidate blending parameters ($\alpha_1$) having other values may be considered as outliers and may be discarded. In another case, the instance "$f(x+1)-f(x-1)=0$" may be allotted a value of $-255$ and may successively be discarded.

From the histogram array 300, the system 106 may capture values of the candidate blending parameters ($\alpha_1$). In one case, the candidate blending parameters ($\alpha_1$) may be captured, from the histogram array, using a moving window of predefined size. For example, size of the moving window may be 10. The system 106 may create a Window Sum Array (WSA) using an aggregate of number of pixels corresponding to the candidate blending parameters ($\alpha_1$), present within the predefined moving window. Post creating the WSA, the system 106 may select an index of a peak value from WSA as the estimated blending parameter ($\alpha$).

In one embodiment, the system 106 may validate the estimated blending parameter ($\alpha$). The validation may comprise updating the peak value. The updating may comprise dividing the peak value by a total number of pixels in a video frame. Successively, the updated peak value may be compared with a first blending threshold. When the updated peak value exceeds the first blending threshold, the system 106 may compare index of the updated peak value with a second blending threshold. The system 106 may successively use the index of the updated peak value as the blending parameter ($\alpha$), while the updated peak value lies within a predefined range of the second blending threshold.

Post determining the blending parameter ($\alpha$), the system 106 may create a blended image (B). The system 106 may create the blended image (B) by mixing contents of the previous image ($f(x-1)$) and the next image ($f(x+1)$), based on the estimated blending parameter ($\alpha$). The system 106 may create the blended image (B) based on a below mention equation 3.

$$B=(1-\alpha)f(x-1)+\alpha f(x+1) \qquad \text{Equation 3}$$

After creating the blended image (B), the system 106 may determine a first similarity between the blended image (B) and a de-interlaced image (C). The de-interlaced image is the current image $f(x)$ with the ghosting artifact. To determine the first similarity, at first, the system 106 may divide the blended image (B) into multiple blocks. In one case, the blended image (B) may be divided into blocks of dimension 16*16. Successively, the system 106 may find a successful match between each of multiple blocks of the blended image (B) and blocks present in a predefined region of the de-interlaced image (C). The successful match may be found based on a maximum value of Normalized Cross Correlation (NCC) between the multiple blocks of the blended image (B) and blocks present within the predefined region of the de-interlaced image (C).

Successively, the system 106 may determine a number of matched blocks between the blended image (B) and the de-interlaced image (C) with values of NCC exceeding a first predefined threshold. Thereafter, the system 106 may determine the blended image (B) and the de-interlaced image (C) to be similar if the number of matched blocks exceeds a second predefined threshold. Successful finding of the first similarity may indicate that the de-interlaced image (C) i.e. the current image $f(x)$ comprises the ghosting artifact.

Post validation based on the first similarity, the system 106 may validate the ghosting artifact based on a second similarity between the blended image (B) and the de-interlaced image (C). The system 106 may compute the second similarity by deriving an absolute difference frame between the blended image (B) and the de-interlaced image (C). Successively, the system 106 may divide the difference frame into multiple blocks. In one case, the absolute difference frame may be divided into blocks of dimension 16*16. The system 106 may later determine values of standard deviation of each of the multiple blocks of the absolute difference frame.

Successively, the system 106 may determine a number of blocks in the absolute difference frame between the blended image (B) and the de-interlaced image (C), with values of standard deviation less than a third predefined threshold. The system 106 may determine the blended image (B) and the de-interlaced image (C) to be similar while the number of blocks is greater than a fourth predefined threshold. Successful computing of the second similarity may indicate that the de-interlaced image (C) i.e. the current image $f(x)$ comprises the ghosting artifact.

In one embodiment, the system 106 may verify the de-interlaced image (C) i.e. the current image $f(x)$ to comprise digital ghosting artifact, based on values of the first similarity and the second similarity.

The above described method has potential applications in numerous digital video capturing and processing systems for identification of ghosting artifact. Successful detection of the ghosting artifact in a digital video segment may lead to elimination of the old segment and recapturing of a new segment, thereby improving a quality of the video.

Figure 4:
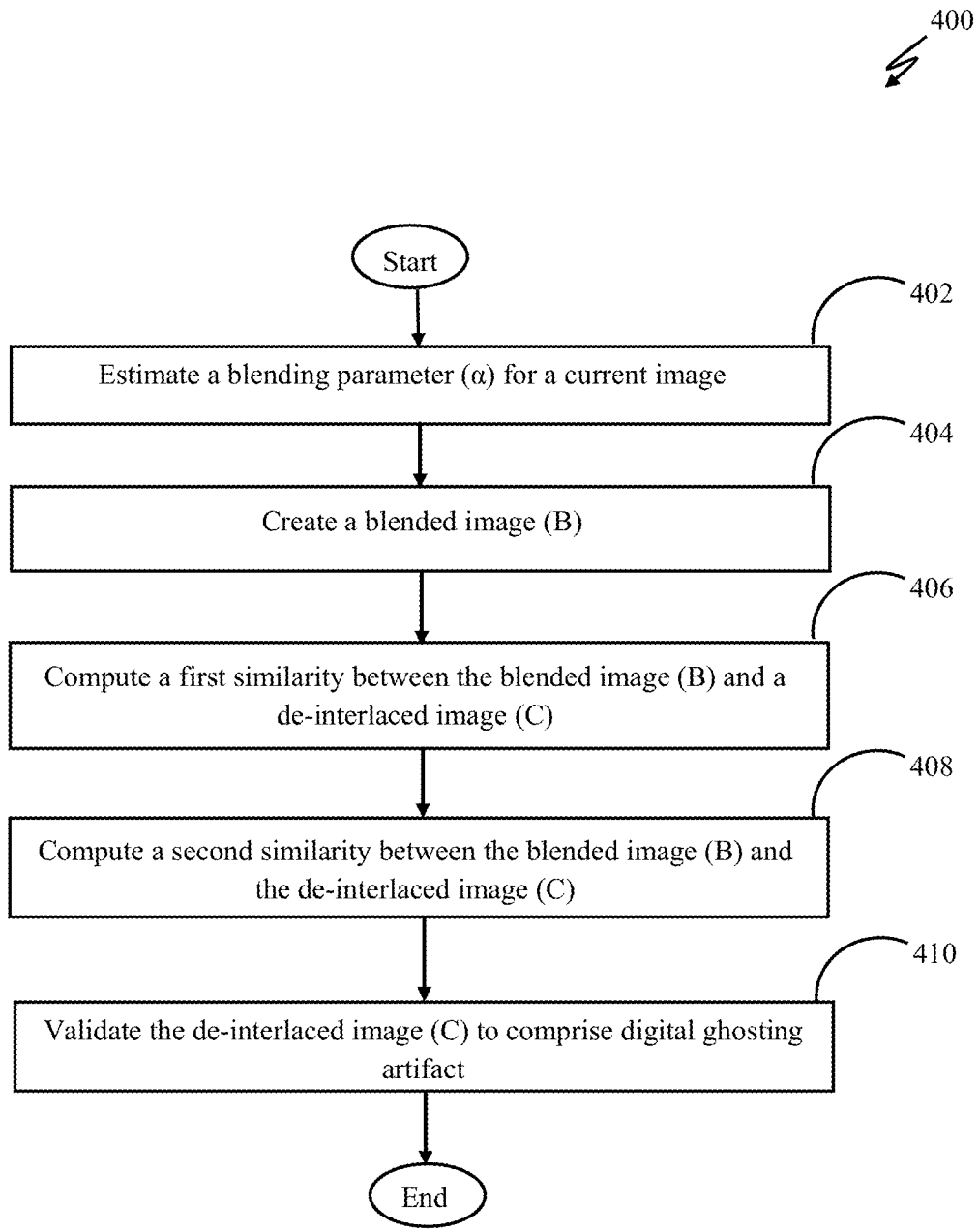
FIG. 4 illustrates a flow chart 400 depicting a method of identifying presence of digital ghosting artifacts in videos, according to an example embodiment.

FIG. 4 illustrates a flowchart showing a method of identifying presence of digital ghosting artifacts in videos, according to an embodiment. FIG. 4 comprises a flowchart 400 that is explained in conjunction with the elements disclosed in FIG. 1. The flowchart 400 starts at the step 402 and proceeds to step 410.

At step 402, a blending parameter ($\alpha$) may be estimated. The blending parameter ($\alpha$) may be estimated using a previous image and a next image. In one embodiment, the blending parameter ($\alpha$) may be estimated by the processor 110.

At step 404, a blended image (B) may be created. The blended image (B) may be created by mixing contents of the previous image and the next image. The contents may be mixed based on the estimated blending parameter ($\alpha$). In one embodiment, the blended image (B) may be created by the processor 110.

At step 406, a first similarity may be computed between the blended image (B) and a de-interlaced image (C). The first similarity may be computed based on a Normalized Cross Correlation (NCC) between multiple blocks of the blended image (B) and the de-interlaced image (C). In one embodiment, the first similarity may be computed by the processor 110.

At step 408, a second similarity may be computed between the blended image (B) and the de-interlaced image (C). The second similarity may be computed based on values of standard deviation computed for multiple blocks in a difference frame determined between the blended image (B) and the de-interlaced image (C). In one embodiment, the second similarity may be computed by the processor 110.

At step 410, the de-interlaced image may be validated to comprise digital ghosting artifact. The digital ghosting artifact may be detected based on values of the first similarity and the second similarity. In one embodiment, the de-interlaced image may be validated to comprise digital ghosting artifact by the processor 110.

Figure 5:
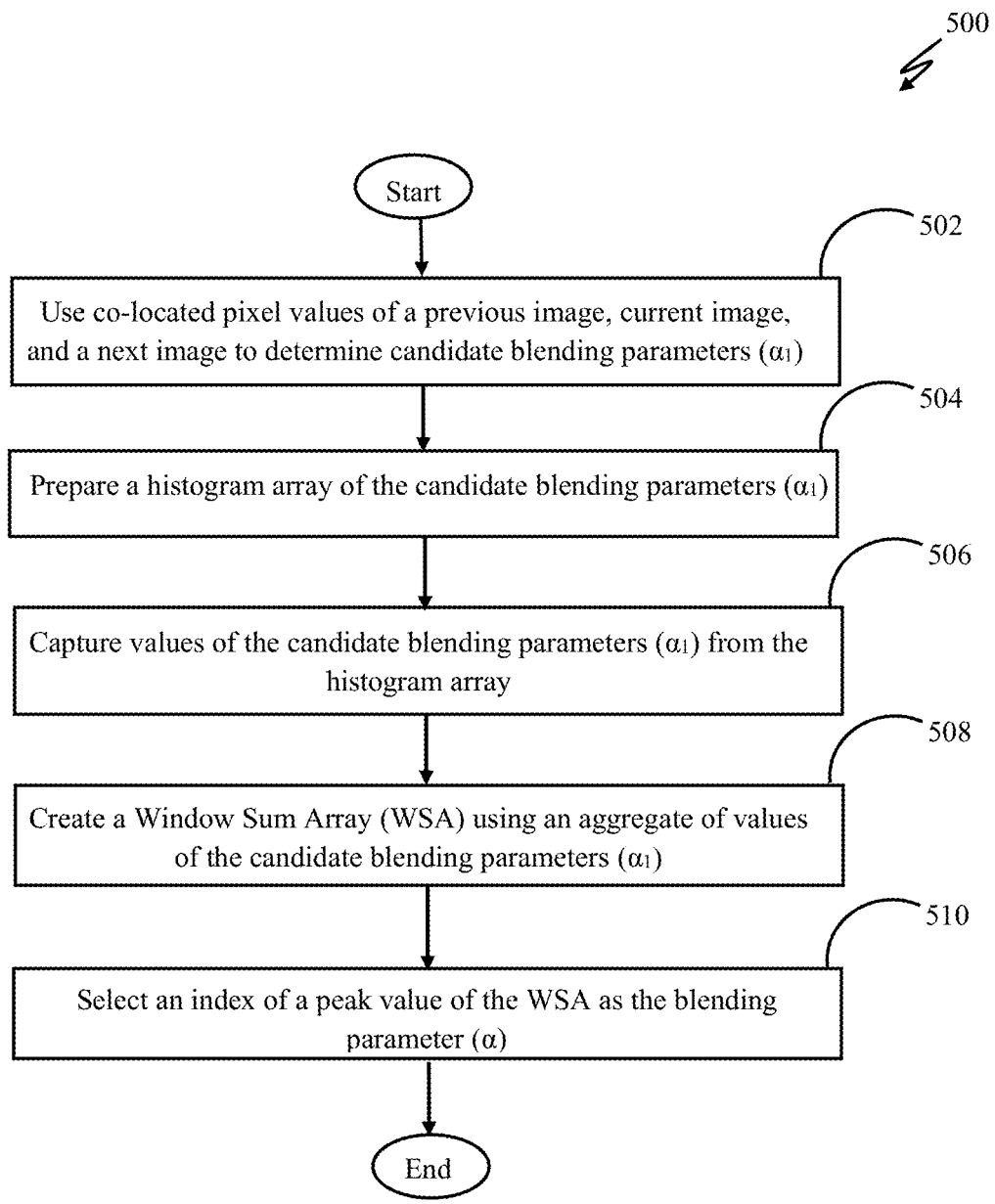
FIG. 5 illustrates a flow chart 500 depicting a method of estimating a blending parameter ($\alpha$), according to an example embodiment.

FIG. 5 illustrates a flowchart showing a method of estimating a blending parameter ($\alpha$), according to an embodiment. FIG. 5 comprises a flowchart 500 that is explained in conjunction with the elements disclosed in FIG. 1. The flowchart 500 starts at the step 502 and proceeds to step 510.

At step 502, co-located pixel values of a previous image, current image, and a next image. The co-located pixel values may be used to determine candidate blending parameters ($\alpha_1$). In one embodiment, the candidate blending parameter ($\alpha_1$) may be determined by the processor 110.

At step 504, a histogram array of the candidate blending parameters ($\alpha_1$) may be prepared. In one embodiment, the histogram array may be prepared by the processor 110.

At step 506, values of the candidate blending parameters ($\alpha_1$) may be captured from the histogram array. In one embodiment, values of the candidate blending parameters ($\alpha_1$) may be captured by the processor 110.

At step 508, a Window Sum Array (WSA) may be created using an aggregate of values of the candidate blending parameters ($\alpha_1$). In one embodiment, the WSA may be created by the processor 110.

At step 510, an index of a peak of the WSA may be selected as the estimated blending parameter ($\alpha$). In one embodiment, the index of peak value may be selected by the processor 110.

The flow charts of FIG. 4 and FIG. 5 show the method steps executed according to one or more embodiments of the present disclosure. In this regard, each block may represent a module, segment, or portion of code, which comprises one or more executable instructions for implementing the specified logical function(s). It should also be noted that in some alternative implementations, the functions noted in the blocks may occur out of the order noted in the drawings. For example, two blocks shown in succession in FIG. 4 and FIG. 5 may in fact be executed substantially concurrently or the blocks may sometimes be executed in the reverse order, depending upon the functionality involved. Any process descriptions or blocks in flow charts should be understood as representing modules, segments, or portions of code which include one or more executable instructions for implementing specific logical functions or steps in the process, and alternate implementations are included within the scope of the example embodiments in which functions may be executed out of order from that shown or discussed, including substantially concurrently or in reverse order, depending on the functionality involved. In addition, the process descriptions or blocks in flow charts should be understood as representing decisions made by a hardware structure such as a state machine.

The logic of the example embodiment(s) can be implemented in hardware, software, firmware, or a combination thereof. In example embodiments, the logic is implemented in software or firmware that is stored in a memory and that is executed by a suitable instruction execution system 106. If implemented in hardware, as in an alternative embodiment, the logic can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. In addition, the scope of the present disclosure includes embodying the functionality of the example embodiments disclosed herein in logic embodied in hardware or software-configured mediums.

Embodiments of the present disclosure may be provided as a computer program product, which may include a computer-readable medium tangibly embodying thereon instructions, which may be used to program a computer (or other electronic devices) to perform a process. The computer-readable medium may include, but is not limited to, fixed (hard) drives, magnetic tape, floppy diskettes, optical disks, compact disc read-only memories (CD-ROMs), and magneto-optical disks, semiconductor memories, such as ROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present disclosure may also be downloaded as one or more computer program products, wherein the program may be transferred from a remote computer to a requesting computer by way of data signals embodied in a carrier wave or other propagation medium via a communication link (e. g., a modem or network connection).

Moreover, although the present disclosure and its advantages have been described in detail, it should be understood that various changes, substitutions and alterations can be made herein without departing from the disclosure as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method of identifying presence of digital ghosting artifacts in videos, the method comprising:
   estimating, by a processor, a blending parameter ($\alpha$) for a current image using a previous image and a next image of a digital video stream by:
      using co-located pixel values of the previous image, the current image, and the next image to determine candidate blending parameters ($\alpha_1$);
      preparing a histogram array of the candidate blending parameters ($\alpha_1$);
      capturing values of the candidate blending parameters ($\alpha_1$), from the histogram array, using a moving window of predefined size;
      creating a Window Sum Array (WSA) using an aggregate of number of pixels corresponding to the candidate blending parameters ($\alpha_1$), present within the moving window; and
      selecting an index of a peak value of the WSA as the blending parameter ($\alpha$);
   creating, by the processor, a blended image (B) by mixing contents of the previous image and the next image based on the estimated blending parameter ($\alpha$);
   computing, by the processor, a first similarity between the blended image (B) and a de-interlaced image (C) based on a Normalized Cross Correlation (NCC) between multiple blocks of the blended image (B) and the de-interlaced image (C);
   computing, by the processor, a second similarity between the blended image (B) and the de-interlaced image (C) based on values of standard deviation computed for multiple blocks in an absolute difference frame determined between the blended image (B) and the de-interlaced image (C); and
   validating, by the processor, the de-interlaced image (C) to comprise digital ghosting artifact based on values of the first similarity and the second similarity.

2. The method of claim 1, wherein the candidate blending parameters ($\alpha_1$) are determined using the previous image, the current image, and the next image based on the relation:

$\alpha=(f(x)-f(x-1))*100/(f(x+1)-f(x-1))$, wherein f(x−1) denotes the previous image, f(x) denotes the current image, and f(x+1) denotes the next image.

3. The method of claim 1, wherein the arrays of the candidate blending parameters ($\alpha_1$) comprises values ranging from 0 to 100.

4. The method of claim 1, further comprising validating the estimated blending parameter ($\alpha$) by updating the peak value, wherein the updating comprises dividing the peak value by a total number of pixels in a video frame.

5. The method of claim 4, further comprising selecting an index of the updated peak value as the blending parameter ($\alpha$) while the updated peak value exceeds a first blending threshold and lies within a predefined range of the second blending threshold.

6. The method of claim 1, wherein computing the first similarity between the blended image (B) and the de-interlaced image (C) further comprises:
   dividing the blended image (B) into multiple blocks;
   finding a successful match of each of the multiple blocks of the blended image (B) within blocks present in a predefined region of the de-interlaced image (C), wherein the successful match is found based on a maximum value of Normalized Cross Correlation (NCC) between the multiple blocks of the blended image (B) and blocks present within the predefined region of the de-interlaced image (C);
   determining a number of matched blocks between the blended image (B) and the de-interlaced image (C) with values of NCC exceeding a first predefined threshold; and
   determining the blended image (B) and the de-interlaced image (C) to be similar while the number of matched blocks exceeds a second predefined threshold.

7. The method of claim 1, wherein computing the second similarity between the blended image (B) and the de-interlaced image (C) further comprises:
   deriving the absolute difference frame between the blended image (B) and the de-interlaced image (C);
   dividing the absolute difference frame into multiple blocks;
   determining values of standard deviation of each of the multiple blocks of the absolute difference frame;
   determining a number of blocks between the blended image (B) and the de-interlaced image (C) with values of standard deviation less than a third predefined threshold; and
   determining the blended image (B) and the de-interlaced image (C) to be similar while the number of blocks is greater than a fourth predefined threshold.

8. A method of identifying presence of digital ghosting artifacts in videos, the method comprising:
   estimating, by a processor, a blending parameter ($\alpha$) for a current image using a previous image and a next image of a digital video stream;
   creating, by the processor, a blended image (B) by mixing contents of the previous image and the next image based on the estimated blending parameter ($\alpha$);
   computing, by the processor, a first similarity between the blended image (B) and a de-interlaced image (C) based on a Normalized Cross Correlation (NCC) between multiple blocks of the blended image (B) and the de-interlaced image (C);
   computing, by the processor, a second similarity between the blended image (B) and the de-interlaced image (C) based on values of standard deviation computed for multiple blocks in an absolute difference frame determined between the blended image (B) and the de-interlaced image (C); and
   validating, by the processor, the de-interlaced image (C) to comprise digital ghosting artifact based on values of the first similarity and the second similarity.

9. The method of claim 8, further comprising validating the estimated blending parameter ($\alpha$) by updating a peak value of Window Sum Array (WSA) created using an aggregate of number of pixels corresponding to candidate blending parameters ($\alpha_1$), wherein the updating comprises dividing the peak value by a total number of pixels in a video frame.

10. The method of claim 9, further comprising selecting an index of the updated peak value as the blending parameter ($\alpha$) while the updated peak value exceeds a first blending threshold and lies within a predefined range of the second blending threshold.

11. The method of claim 8, wherein computing the first similarity between the blended image (B) and the de-interlaced image (C) further comprises:

dividing the blended image (B) into multiple blocks;
finding a successful match of each of the multiple blocks of the blended image (B) within blocks present in a predefined region of the de-interlaced image (C), wherein the successful match is found based on a maximum value of Normalized Cross Correlation (NCC) between the multiple blocks of the blended image (B) and blocks present within the predefined region of the de-interlaced image (C);
determining a number of matched blocks between the blended image (B) and the de-interlaced image (C) with values of NCC exceeding a first predefined threshold; and
determining the blended image (B) and the de-interlaced image (C) to be similar while the number of matched blocks exceeds a second predefined threshold.

12. The method of claim 8, wherein computing the second similarity between the blended image (B) and the de-interlaced image (C) further comprises:
deriving the absolute difference frame between the blended image (B) and the de-interlaced image (C);
dividing the absolute difference frame into multiple blocks;
determining values of standard deviation of each of the multiple blocks of the absolute difference frame;
determining a number of blocks between the blended image (B) and the de-interlaced image (C) with values of standard deviation less than a third predefined threshold; and
determining the blended image (B) and the de-interlaced image (C) to be similar while the number of blocks are greater than a fourth predefined threshold.

13. A system for identifying presence of digital ghosting artifacts in videos, the system comprising:
a processor; and
a memory, wherein the processor is configured to execute programmed instructions stored in the memory to:
estimate a blending parameter ($\alpha$) for a current image using a previous image and a next image of a digital video stream by:
using co-located pixel values of the previous image, the current image, and the next image to determine candidate blending parameters ($\alpha_1$);
preparing a histogram array of the candidate blending parameters ($\alpha_1$);
capturing values of the candidate blending parameters ($\alpha_1$), from the histogram array, using a moving window of predefined size;
creating a Window Sum Array (WSA) using an aggregate of number of pixels corresponding to the candidate blending parameters ($\alpha_1$), present within the moving window; and
selecting an index of a peak value of the WSA as the blending parameter ($\alpha$);
create a blended image (B) by mixing contents of the previous image and the next image based on the estimated blending parameter ($\alpha$);
compute a first similarity between the blended image (B) and a de-interlaced image (C) based on a Normalized Cross Correlation (NCC) between multiple blocks of the blended image (B) and the de-interlaced image (C);
compute a second similarity between the blended image (B) and the de-interlaced image (C) based on values of standard deviation computed for multiple blocks in an absolute difference frame determined between the blended image (B) and the de-interlaced image (C); and
validate the de-interlaced image (C) to comprise digital ghosting artifact based on values of the first similarity and the second similarity.

14. The system of claim 13, wherein the candidate blending parameters ($\alpha_1$) are determined using the previous image, the current image, and the next image based on the relation:

$$\alpha = (f(x) - f(x-1)) * 100 / (f(x+1) - f(x-1)),$$

wherein $f(x-1)$ denotes the previous image, $f(x)$ denotes the current image, and $f(x+1)$ denotes the next image.

15. The system of claim 13, wherein the arrays of the candidate blending parameters ($\alpha_1$) comprises values ranging from 0 to 100.

16. The system of claim 13, further comprising validating the estimated blending parameter ($\alpha$) by updating the peak value, wherein the updating comprises dividing the peak value by a total number of pixels in a video frame.

17. The system of claim 13, further comprising selecting an index of the updated peak value as the blending parameter ($\alpha$) while the updated peak value exceeds a first blending threshold and lies within a predefined range of the second blending threshold.

18. The system of claim 13, wherein computing the first similarity between the blended image (B) and the de-interlaced image (C) further comprises:
dividing the blended image (B) into multiple blocks;
finding a successful match of each of the multiple blocks of the blended image (B) within blocks present in a predefined region of the de-interlaced image (C), wherein the successful match is found based on a maximum value of Normalized Cross Correlation (NCC) between the multiple blocks of the blended image (B) and blocks present within the predefined region of the de-interlaced image (C);
determining a number of matched blocks between the blended image (B) and the de-interlaced image (C) with values of NCC exceeding a first predefined threshold; and
determining the blended image (B) and the de-interlaced image (C) to be similar while the number of matched blocks exceeds a second predefined threshold.

19. The system of claim 13, wherein computing the second similarity between the blended image (B) and the de-interlaced image (C) further comprises:
deriving the absolute difference frame between the blended image (B) and the de-interlaced image (C);
dividing the absolute difference frame into multiple blocks;
determining values of standard deviation of each of the multiple blocks of the absolute difference frame;
determining a number of blocks between the blended image (B) and the de-interlaced image (C) with values of standard deviation less than a third predefined threshold; and
determining the blended image (B) and the de-interlaced image (C) to be similar while the number of blocks are greater than a fourth predefined threshold.

20. A non-transient computer-readable medium comprising instructions for causing a programmable processor to identify presence of digital ghosting artifacts in videos by:
estimating a blending parameter ($\alpha$) for a current image using a previous image and a next image of a digital video stream by:

using co-located pixel values of the previous image, the current image, and the next image to determine candidate blending parameters ($\alpha_1$);

preparing a histogram array of the candidate blending parameters ($\alpha_1$);

capturing values of the candidate blending parameters ($\alpha_1$), from the histogram array, using a moving window of predefined size;

creating a Window Sum Array (WSA) using an aggregate of number of pixels corresponding to the candidate blending parameters ($\alpha_1$), present within the moving window; and selecting an index of a peak value of the WSA as the blending parameter ($\alpha$);

creating a blended image (B) by mixing contents of the previous image and the next image based on the estimated blending parameter ($\alpha$);

computing a first similarity between the blended image (B) and a de-interlaced image (C) based on a Normalized Cross Correlation (NCC) between multiple blocks of the blended image (B) and the de-interlaced image (C);

computing a second similarity between the blended image (B) and the de-interlaced image (C) based on values of standard deviation computed for multiple blocks in an absolute difference frame determined between the blended image (B) and the de-interlaced image (C); and validating the de-interlaced image (C) to comprise digital ghosting artifact based on values of the first similarity and the second similarity.

* * * * *